United States Patent
Areno et al.

(10) Patent No.: US 11,178,159 B2
(45) Date of Patent: Nov. 16, 2021

(54) CROSS-DOMAIN SOLUTION USING NETWORK-CONNECTED HARDWARE ROOT-OF-TRUST DEVICE

(71) Applicant: Raytheon Company, Waltham, MA (US)

(72) Inventors: Matthew C. Areno, Round Rock, TX (US); Rex A. Nelson, Austin, TX (US)

(73) Assignee: Raytheon Company, Waltham, MA (US)

( * ) Notice: Subject to any disclaimer, the term of this patent is extended or adjusted under 35 U.S.C. 154(b) by 298 days.

(21) Appl. No.: 16/398,641

(22) Filed: Apr. 30, 2019

(65) Prior Publication Data
US 2020/0084229 A1    Mar. 12, 2020

Related U.S. Application Data (60) Provisional application No. 62/728,221, filed on Sep. 7, 2018.

(51) Int. Cl.
*H04L 29/06*    (2006.01)

(52) U.S. Cl.
CPC ...... *H04L 63/1416* (2013.01); *H04L 63/1441* (2013.01); *H04L 63/20* (2013.01)

(58) Field of Classification Search
CPC . H04L 63/1416; H04L 63/1441; H04L 63/20; G06F 21/52; G06F 21/71
See application file for complete search history.

(56) References Cited

U.S. PATENT DOCUMENTS

| | | |
|---|---|---|
| 6,473,857 B1 | 10/2002 | Panas et al. |
| 7,260,555 B2 | 8/2007 | Rossmann et al. |
| 9,235,709 B2 | 1/2016 | Kim et al. |
| 9,251,343 B1 | 2/2016 | Vincent et al. |
| 9,319,380 B2 | 4/2016 | Lukacs et al. |

(Continued)

FOREIGN PATENT DOCUMENTS

| | | |
|---|---|---|
| EP | 1 764 721 A2 | 3/2007 |
| EP | 3 422 661 A1 | 1/2019 |

(Continued)

OTHER PUBLICATIONS

PCT International Preliminary Report dated Mar. 18, 2021 for International Application No. PCT/US2019/045607; 7 pages.

(Continued)

*Primary Examiner* — Abiy Getachew
(74) *Attorney, Agent, or Firm* — Daly, Crowley, Mofford & Durkee, LLP (57) ABSTRACT

The concepts, systems and methods described herein are directed towards a security system. The system is provided to include a Hardware Root of Trust (HRoT) device comprising a processor and memory that is configured for connection and authentication to first and second host devices which are configured to communicate via a first communication channel having a first security level and a second communication channel having a second security level which is more secure than the first security level. The HRoT device is configured to: connect the first and second host devices via the second communication channel; and monitor the security of the first and second host devices over the second communication channel.

18 Claims, 5 Drawing Sheets

(56) References Cited

U.S. PATENT DOCUMENTS

| | | | |
|---|---|---|---|
| 9,509,587 B1* | 11/2016 | Marquardt | H04L 45/38 |
| 9,600,291 B1 | 3/2017 | Atsatt | |
| 9,626,512 B1 | 4/2017 | Brandwine et al. | |
| 10,027,717 B2 | 7/2018 | Ben-Shalom et al. | |
| 2004/0003262 A1 | 1/2004 | England et al. | |
| 2004/0177260 A1 | 9/2004 | Gilfix et al. | |
| 2005/0138409 A1 | 6/2005 | Sheriff et al. | |
| 2006/0015748 A1 | 1/2006 | Goto et al. | |
| 2006/0026417 A1 | 2/2006 | Furusawa et al. | |
| 2008/0307488 A1* | 12/2008 | Hammond, II | H04L 63/20 726/1 |
| 2009/0204964 A1* | 8/2009 | Foley | G06F 9/45558 718/1 |
| 2010/0070743 A1 | 3/2010 | Grigor et al. | |
| 2010/0250796 A1 | 9/2010 | Jevans et al. | |
| 2014/0068275 A1 | 3/2014 | Swanson et al. | |
| 2014/0298026 A1 | 10/2014 | Isozaki et al. | |
| 2015/0012737 A1 | 1/2015 | Newell | |
| 2016/0125187 A1 | 5/2016 | Oxford | |
| 2016/0162669 A1 | 6/2016 | Mikhailov et al. | |
| 2016/0378996 A1 | 12/2016 | Smith et al. | |
| 2017/0104770 A1 | 4/2017 | Jreij et al. | |
| 2017/0132417 A1 | 5/2017 | Martinez | |
| 2017/0180318 A1 | 6/2017 | Lutas et al. | |
| 2017/0213053 A1 | 7/2017 | Areno et al. | |
| 2017/0364685 A1 | 12/2017 | Shah et al. | |
| 2018/0034793 A1 | 2/2018 | Kibalo et al. | |
| 2018/0089425 A1 | 3/2018 | Trikalinou | |
| 2018/0165448 A1 | 6/2018 | Nightingale et al. | |
| 2018/0255077 A1* | 9/2018 | Paine | H04L 63/145 |
| 2018/0260009 A1 | 9/2018 | Roeder | |
| 2018/0278418 A1 | 9/2018 | Chang et al. | |
| 2018/0365425 A1 | 12/2018 | Packer Ali et al. | |
| 2019/0042516 A1 | 2/2019 | Browning et al. | |
| 2019/0050604 A1 | 2/2019 | Weber et al. | |
| 2019/0073478 A1* | 3/2019 | Khessib | G06F 21/572 |

FOREIGN PATENT DOCUMENTS

| | | |
|---|---|---|
| KR | 10-1772314 B1 | 9/2017 |
| WO | WO 2010/030157 A1 | 3/2010 |
| WO | WO 2019/023289 A1 | 1/2019 |

OTHER PUBLICATIONS

PCT International Preliminary Report dated Mar. 18, 2021 for International Application No. PCT/US2019/045610; 7 pages.

PCT International Preliminary Report dated Mar. 18, 2021 for International Application No. PCT/US2019/045608; 11 pages.

Response to U.S. Non-Final Office Action dated Dec. 3, 2020 for U.S. Appl. No. 16/371,191; Response filed on Feb. 23, 2021; 8 pages.

U.S. Final Office Action dated Mar. 16, 2021 for U.S. Appl. No. 16/371,191;16 pages.

U.S. Non-Final Office Action dated Dec. 3, 2020 for U.S. Appl. No. 16/371,191; 18 Pages.

PCT International Search Report and Written Opinion dated Aug. 11, 2020 for International Application No. PCT/US2019/045607; 12 Pages.

U.S. Notice of Allowance dated Aug. 24, 2020 for U.S. Appl. No. 16/214,857; 7 Pages.

U.S. Non-Final Office Action dated May 14, 2020 for U.S. Appl. No. 16/214,857; 23 Pages.

PCT International Search Report and Written Opinion dated Jun. 26, 2020 for International Application No. PCT/US2019/045608; 16 Pages.

PCT International Search Report and Written Opinion dated Jun. 25, 2020 for International Application No. PCT/US2020/025178; 12 Pages.

Cooper et al., "BIOS Protection Guidelines," *National Institute of Standards and Technology*—Special Publication 800-147; U.S. Department of Commerce; Apr. 2011; 26 Pages.

Regenscheid, "BIOS Protection Guidelines for Servers;" *National Institute of Standards and Technology*—NIST Special Publication 800-147B; U.S. Department of Commerce; Aug. 2014; 32 Pages.

Regenscheid et al., "BIOS Integrity Measurement Guidelines (Draft);" *National Institute of Standards and Technology*—Special Publication 800-155; U.S. Department of Commerce; Dec. 2011; 47 Pages.

Trusted Computing Group, "Trusted Platform Module Library, Part 1: Architecture;" Family "2.0", Level 00, Revision 01.16; TCG Published; Oct. 30, 2014; 147 Pages (Part 1 of 2).

Trusted Computing Group, "Trusted Platform Module Library, Part 1: Architecture;" Family "2.0", Level 00, Revision 01.16; TCG Published; Oct. 30, 2014; 121 Pages (Part 2 of 2).

Wilkins et al., "UEFI Secure Boot in Modern Computer Security Solutions;" www.UEFI.org; Sep. 2013; 10 Pages.

U.S. Appl. No. 16/214,857, filed Dec. 10, 2018, Areno et al.

U.S. Appl. No. 16/255,917, filed Jan. 24, 2019, Areno et al.

U.S. Appl. No. 16/371,191, filed Apr. 1, 2019, Areno et al.

PCT International Search Report and Written Opinion dated May 31, 2019 for International Application No. PCT/US2019/022879; 16 Pages.

Lohrke et al., "No Place to Hide: Contactless Probing of Secret Data on FPGAs;" Conference Paper from International Conference on Cryptographic Hardware and Embedded Systems (CHES 2016); Aug. 4, 2016; pp. 147-167; 21 Pages.

PCT International Preliminary Report dated Oct. 22, 2020 for International Application No. PCT/US2019/022879; 9 Pages.

U.S. Appl. No. 16/722,142, filed Dec. 20, 2019, Hird et al.

U.S. Appl. No. 16/832,192, filed Mar. 27, 2020, Staab.

U.S. Appl. No. 16/832,216, filed Mar. 27, 2020, Staab et al.

PCT International Search Report and Written Opinion dated Jul. 13, 2020 for International Application No. PCT/US2020/025195; 12 Pages.

PCT International Search Report and Written Opinion dated Jul. 14, 2020 for International Application No. PCT/US2019/045610; 12 Pages.

Response to U.S. Non-Final Office Action dated May 14, 2020 for U.S. Appl. No. 16/214,857; Response Filed Jul. 30, 2020; 7 Pages.

U.S. Non-Final Office Action dated Jan. 26, 2021 for U.S. Appl. No. 16/255,917; 26 pages.

U.S. Non-Final Office Action dated Jun. 30, 2021 for U.S. Appl. No. 16/371,191; 16 pages.

U.S. Non-Final Office Action dated Jul. 2, 2021 for U.S. Appl. No. 16/255,917; 21 pages.

Response to U.S. Final Office Action dated Mar. 16, 2021 for U.S. Appl. No. 16/371,191; Response filed on Jun. 15, 2021; 11 pages.

Response to U.S. Non-Final Office Action dated Jan. 26, 2021 for U.S. Appl. No. 16/255,917; Response filed on Mar. 23, 2021; 7 pages.

* cited by examiner

CROSS-DOMAIN SOLUTION USING NETWORK-CONNECTED HARDWARE ROOT-OF-TRUST DEVICE

CROSS-REFERENCE TO RELATED APPLICATIONS

This application claims the benefit of U.S. Provisional Application No. 62/728,221 filed Sep. 7, 2018 under 35 U.S.C. § 119(e) which application is hereby incorporated herein by reference in its entirety.

BACKGROUND

A cross-domain solution (CDS) is a technology for providing an ability to access or transfer information between two or more domains having different security measures, without introducing security threats that may be introduced through unsecured network connections. Known cross-domain solutions attempt to provide a means of utilizing a single computational resource to process both classified and unclassified information. As the solutions use the same physical connection and required isolation is provided by virtualization technologies, the solutions are known to have limitations in providing isolation both physically and logically.

SUMMARY

In accordance with the concepts, techniques and systems described herein is a security system having a secure connection. The techniques and systems described herein may provide secure communications between two or more domains having different security measures without introducing security threats.

Utilizing network connectivity of a security device, such as a Hardware Root of Trust (HRoT) device, may allow the security device to disseminate sensitive or classified information to other devices in the same network. Additionally, the security device may support communications for key management and security reporting through a private network. Furthermore, the monitoring information provided by the security device could be used to analyze attacks against connected devices, create snapshots of the devices, distribute updates to Operating System (OS) and applications of the devices, and/or fight back against attackers by distributing counter-attack measures to the devices.

According to one illustrative embodiment, a system may include a Hardware Root of Trust (HRoT) device comprising a processor and memory that is configured for connection and authentication to first and second host devices which are configured to communicate via a first communication channel having a first security level and a second communication channel having a second security level which is more secure than the first security level. The HRoT device may be configured to: connect the first and second host devices via the second communication channel; and monitor the security of the first and second host devices over the second communication channel.

In embodiments, the HRoT device may be further configured to: detect a security attack to at least one of the first and second host devices; and in response to the security attack, capture a current snapshot of at least one of the first and second host devices, and analyze the security attack based upon the captured current snapshot.

In embodiments, the HRoT device may be further configured to: analyze the security attack based upon the captured current snapshot.

In embodiments, the HRoT device may be further configured to: transmit the captured current snapshot to a trusted element for analysis of the security attack. Here, the trusted element may be configured to: determine a cause of the security attack; determine a counter-attack measure to address the security attack; and distribute the counter-attack measure to at least one of the first and second host devices.

In embodiments, the HRoT device may be configured to: receive a security policy from a trusted element; and monitor the security of the first and second host devices based upon the security policy. Here, the security policy may comprise a plurality of procedures and rules to follow when a security risk is detected at the first and second host devices.

In embodiments, the HRoT device may be further configured to: store respective stable snapshots of the first and second host devices when the first and second host devices are validated; and in response to that a security attack to at least one of the first and second host devices is detected, overwrite at least one of the first and second host devices with a respective stable snapshot.

In embodiments, the HRoT device may be further configured to: receive a request for a secure key information from at least one of the first and second host devices; in response to that the secure key information is not stored in the HRoT device, request the secure key information to a key management server; and provide the secure key information to the respective first or second host device.

In embodiments, the HRoT device may be further configured to: authenticate the first and second host devices before communicating with the first and second host devices.

In embodiments, the HRoT device may be further configured to: establish a binding to a respective Trusted Platform Module (TPM) of the first and second host devices; and authenticate the first and second host devices by exchanging secure keys with the respective TPM of the first and second host devices.

In embodiments, the second communication channel may comprise a Peripheral Component Interconnect Express (PCIe) bus.

In embodiments, at least one of the first and second communication channels may be wireless.

According to one illustrative method, a method running on a security device may include: monitoring security of a first host device and a second host device, wherein the first and second host devices are configured to communicate via a first communication channel having a first security level and a second communication channel having a second security level which is more secure than the first security level and wherein the security device monitors the first and second host devices via the second communication channel; taking respective stable snapshots of the first and second host devices when the first and second host devices are validated; detecting a security attack to the first and second host devices. In response to the security attack to at least one of the first and second host device, the method further include: capturing a current snapshot of the at least one of the first and second host devices where the security attack is detected; analyzing the security attack based upon the captured current snapshot; and overwriting the at least one of the first and second host devices with the respective stable snapshot.

In embodiments, the method may further include: receiving a request for a secure key information from at least one of the first and second host devices; in response to that the secure key information is not stored in the security device, requesting the secure key information to a key management server; and providing the secure key information to the respective first or second host device.

In embodiments, the method may further include: determining a cause of the security attack based upon the captured current snapshot; determining a counter-attack measure to address the security attack; and distributing the counter-attack measure to at least one of the first and second host devices.

In embodiments, the security device may comprise a Hardware Root of Trust (HRoT) device.

According to another illustrative embodiment, a system for security control may include: a first host device comprising a first processor and memory; and a security device coupled to the first host device over a communication channel. Here, the security device may comprise a Command and Control Center (CCC) that is configured to: monitor security of the first host device; take a stable snapshot of the first host device when the first host device is validated; detect a security attack to the first host device; and in response to the security attack, capture a current snapshot of the first host device, analyze the security attack based upon the captured current snapshot, and overwrite the first host device with the stable snapshot.

In embodiments, the CCC may be further configured to: determine a cause of the security attack based upon the captured current snapshot; determine a counter-attack measure to address the security attack; and distribute the counter-attack measure to the first host device.

In embodiments, the system may further include: a second host device comprising a second processor and memory, wherein the first and second host devices are configured to communicate via a first communication channel having a first security level and a second communication channel having a second security level which is more secure than the first security level. Here, the CCC may be configured to: monitor security of the first and second host devices via the second communication channel; take respective stable snapshots of the first and second host devices; detect a security attack to the first and second host devices when the first and second host devices are validated; and in response to the security attack to at least one of the first and second host devices: capture a current snapshot of the at least one of the first and second host devices where the security attack is detected, analyze the security attack based upon the captured current snapshot, and overwrite the first or second host device with the respective stable snapshot.

The details of one or more embodiments of the disclosure are outlined in the accompanying drawings and the description below. Other features, objects, and advantages of the disclosure will be apparent from the description and drawings, and from the claims.

BRIEF DESCRIPTION OF THE DRAWINGS

The foregoing features may be more fully understood from the following description of the drawings in which.

DETAILED DESCRIPTION

For clarity, common items and circuitry, such as integrated circuits, resistors, capacitors, transistors, and the like, have not been included in the figures, as can be appreciated by those of ordinary skill in the pertinent art. Unless otherwise specified, the illustrated embodiments may be understood as providing illustrative features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed concepts, systems, or methods. Additionally, the shapes and sizes of components are intended to be only illustrative and unless otherwise specified, can be altered without materially affecting or limiting the scope of the concepts sought to be protected herein.

Certain introductory concepts and terms used in the specification are collected here.

As used herein, the term "Root of Trust (RoT)" is used to describe a trusted computing module that provides a set of functions that are trusted by other modules in a computing environment, such as an Operating System (OS). The RoT may serve as an independent computing module providing authenticity in a computer or mobile device in which it is embedded. The term "Hardware Root of Trust (HRoT)" device is used to describe a hardware device that provides RoT functions. The HRoT device generally provides, but is not limited to, performing device authentication to ensure that hardware has not been tampered with; verifying the authenticity of software, particularly boot images, to ensure they haven't been tampered with; providing One-Time Programmable (OTP) memory for secure key storage to facilitate encryption; and ensuring that the system is able to be brought into a known and trusted state.

As used herein, the term "Trusted Platform Module (TPM)" is used to describe a specialized device for hardware authentication. The TPM may comprise a dedicated microcontroller that provides secure storage, key generation, and cryptographic operations. The TPM specification is defined by an international standard (ISO/IEC 11889).

Figure 1:
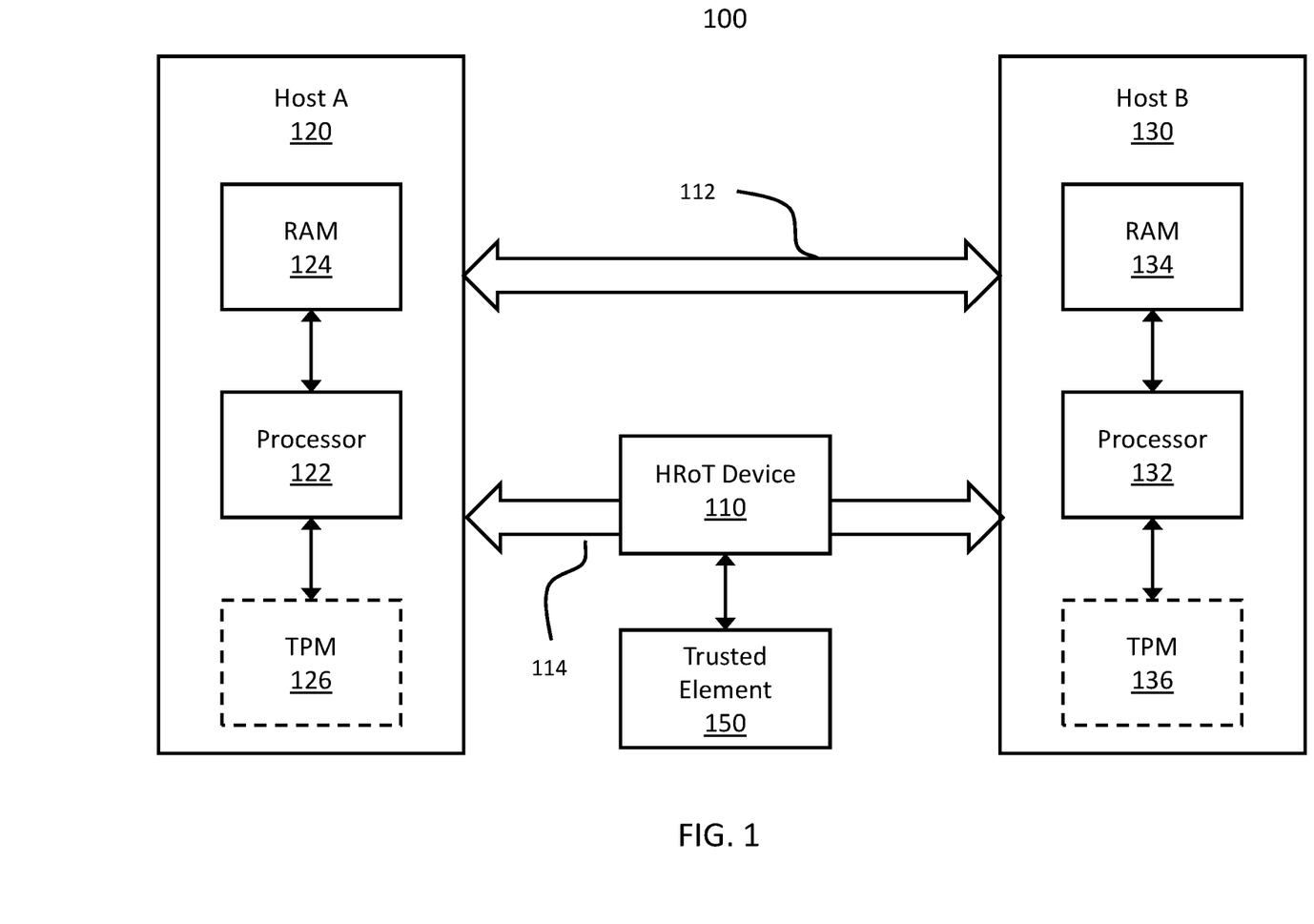
FIG. 1 is a block diagram of an illustrative security system having a secure connection according to the concepts described herein.

Referring now to FIG. 1, an illustrative security system 100 may include a first host device 120 and a second host device 130. The first device 120 and the second device 130 are connected with a first communication channel 112 and a second communication channel 114. The first communication channel 112 may have a lower security level than the second communication channel 114. For example, the first communication channel 112 may provide access to unclassified information and the second communication channel 114 may provide access to classified information. In other embodiments, the first communication channel 112 may comprise an unsecured connection and the second communication channel 114 may comprise a secure connection. The devices 120, 130 may comprise a desktop, server, workstation, mobile, or any other suitable device that can connect to a network. An HRoT device 110 is coupled to the second connection 114. The HRoT device 110 and the other devices 120, 130 may be respective independent systems with similar setups. Each of the systems may have its own processor, memory and other interfaces. In some embodiments, the HRoT device 110 may include a multi-core processor (e.g., 212 in FIG. 2A), memory (e.g., 214 in FIG. 2A), and an optional Trusted Platform Module (TPM) (e.g., 218 in FIG. 2A). The host devices 120, 130 may include respective central processing units (CPUs) 122, 132 and memories 124, 134. In some embodiments, the host devices 120, 130 may include optional TPM devices 126, 136.

The architecture of a security system presented herein utilizes two separate communication channels or network connections. An unclassified or open communication channel 112 connects the first and second devices 120, 130. Another classified or high-security communication channel 114, such as a Peripheral Component Interconnect Express (PCIe) bus, connects the devices 120, 130. The classified communication channel 114 is coupled to an HRoT device 110. In embodiments, the HRoT device 110 and the host devices 120, 130 are required to be authenticated by each other before starting communications. For example, the host devices 120, 130 may need to provide an encrypted key to the HRoT device 110, and the HRoT device 110 may decrypt the key and validate the key by comparing a hash value of the key that is stored in the HRoT device 110. However, as can be appreciated by those of ordinary skill in the pertinent art, any other suitable techniques may be used to authenticate the HRoT device 110 and the host devices 120, 130. Once authenticated, information can be transferred between the host devices 120, 130 and the HRoT device 110 via the second connection 114. In embodiments, instead of requiring the host devices 120, 130 to read network data from the second connection 114 after going through a separate authentication procedure, a driver may be provided that puts a standard network interface on top of the second connection. In this way, the connection to the HRoT device 110 can be handled in a manner similar to a conventional network connection rather than a specialized connection. In some embodiments, the HRoT device 110 may establish a connection to an optional TPM 126, 136 in the first and second host devices 120, 130. The TPMs 126, 136 may be integrated into the boot sequence of the host devices to provide authentication of the host devices 120, 130. For example, the HRoT device 110 may perform a discovery procedure with the TPMs 126, 136 to establish a binding connection, where the discovery procedure includes exchanging secure data and keys with the TPMs 126, 136.

In embodiments, the second connection 114 may comprise a Peripheral Component Interconnect Express (PCIe) bus. Accordingly, the HRoT device 110 may access the first and second devices 120, 130 through Direct Memory Access (DMA) transactions that are supported by the PCIe bus. DMA allows the HRoT device 110 to directly access the memories 124, 134 of the first and second devices 120, 130. That is, the HRoT device 110 may read from or write to the memories 124, 134 directly as needed. In other embodiments, through the PCIe bus, the HRoT device 110 can share its internal memory with the host devices 120, 130. Accordingly, the host devices 120, 130 may control and monitor the data located in a specified memory range shared through the PCIe bus 114. This memory range may be mapped into the address space of the memories 124, 134 of the first and second devices 120, 130. The host devices 120, 130 also can read and potentially modify this data if desired.

In embodiments, the HRoT device 110 may monitor the security of the first and second devices 120, 130 over the second connection 114. The HRoT device 110 may load and execute a security monitoring application to monitor the host devices regarding its hardware and software for any security concerns. In some embodiments, the security monitoring application may be loaded and executed in the HRoT device 110. In other embodiments, the HRoT device 110 may load and execute a process to work with applications executing on the first and second host devices 120, 130 to perform monitoring functions. The monitoring functions may be implemented through a 'tamper detection mechanism' by intercepting events including, but not limited to, voltage changes, clock skewing, and Joint Test Action Group (JTAG) connection events. In some embodiments, the security monitoring application may receive inputs or events from a voltage sensor of the first and second host devices 120, 130. The security monitoring application then may detect any abnormal trends in the voltage values of the first and second host devices 120, 130 and determine if any tempering is done to the first and second host devices 120, 130. Similarly, the security monitoring application may monitor any suspicious activities by monitoring clock values or other events from JTAG connections to the first and second devices 120, 130. In embodiments, the JTAG connection may connect to an on-chip test access port (TAP) of the first and second host devices 120, 130 and may access a set of test registers to test various parts of the devices and detect issues, for example, a circuit fault. The security monitoring application may also monitor inputs and outputs to/from the first and second devices 120, 130. The HRoT device 110 may have a security policy and may use the security policy to perform monitoring of the devices 120, 130. In some embodiments, the security policy may include a set of standard procedures, rules, and behaviors pertaining to information security of the host devices 120, 130 to address security risks when the security risk is detected. The security policy may be provided by an external system (hereinafter a "trusted element") 150 that is trusted and/or validated by the HRoT device 110. To become trusted by the HRoT device 110, the trusted element 150 may need to go through a validation procedure. For example, the trusted element 150 may need to provide an encrypted key to the HRoT device 110, and the HRoT device 110 may decrypt the key and validate the key by comparing a hash value of the key that is stored in the HRoT device 110. Alternately, any suitable method may be used to validate the trusted element 150. The trusted element 150 may provide a new security policy to the HRoT device 110. Then, the HRoT device 110 may revise the security policy stored in the HRoT device 110 with the new security policy from the trusted element 150.

The HRoT device 110 may capture respective snapshots of the first and second device 120, 130 the devices 120, 130 are in their stable state, which means that there has been no security risk identified. In embodiments, the snapshots may include a dump of device memory, state of registers, a list of processes, and any other information/data to capture the state of the devices. The HRoT device 110 may capture a 'stable snapshot' automatically when the first or second device 120, 130 is validated and does not have any security risks. Alternately, the HRoT device 110 may capture a stable snapshot according to a pre-determined schedule. In another embodiment, the HRoT device 110 may capture a stable snapshot only when it is instructed to do so. In some embodiments, the HRoT device 110 may directly access the first or second device 120, 130 via DMA transactions, and capture a corresponding snapshot. Alternately, the HRoT device 110 may use a pre-defined interface, such as Web Services, provided by the first and second devices 120, 130 to capture the snapshots. When a security attack is detected at the first or second device 120, 130, the HRoT device 110 may capture a current snapshot of the devices 120, 130. Depending on the location and/or characteristics of the security attack, the HRoT device 110 may capture snapshots of either one of the first or second device 120, 130 or both. The captured current snapshot is analyzed to find relevant information for the security attack. In some embodiments, the HRoT device 110 may send the captured current snapshot to the trusted element 150 where the snapshot is analyzed. The trusted element 150 may determine a cause of the security attack and develop a counter-attack measure to address the security attack. In addition, the trusted element 150 may distribute the counter-attack measure to any devices in the network to which the trusted element 150 is connected. For example, the trusted element 150 may apply the counter-attack measure to the first and second devices 120, 130 through the HRoT device 110. The first and second device 120, 130 then transmit the counter-attack measure to other devices that are connected to the first and second devices 120, 130. Furthermore, in response to the security attack, the HRoT device 110 may overwrite the first and/or second devices 120, 130 with the respective stable snapshot captured during their stable state such that the first and/or second devices 120, 130 are resumed to their respective stable state.

The first connection 112 may comprise a conventional network connection providing unclassified access, including a local area network ("LAN"), a wide area network ("WAN"), the Internet, mobile telephone networks, Plain Old Telephone (POTS) networks, and wireless data networks (e.g., WiFi and WiMax networks). The second connection 114 may comprise a network connection with security control. In some embodiments, the second connection may comprise a Peripheral Component Interconnect Express (PCIe) bus that allows DMA transactions over the first and second devices 120, 130. In addition to monitoring security of the devices 120, 130, the second connection 114 may be used to pass secure information between the host devices 120, 130. One example of such a secure exchange is the distribution of keys. Instead of requesting the information directly to a separate key management server that maintains secure information such as keys, a device 120 may request key information to the HRoT device 110 through the second connection 114. For example, the first host device 120 may request an encryption key to communicate with the second host device 130 to the separate key management server. In some embodiments, this separate key management server may be the trusted element 150 in FIG. 1. The request would be sent to the HRoT device 110. When the HRoT device 110 has the requested encryption key, the HRoT device 110 may provide the requested encryption key to the host device 120 without forwarding the request to the key management server. In some embodiment, the HRoT device 110 may send the request to the key management server, for example the trusted element 150. Once the key is returned to the HRoT device 110, the key information is sent back to the requesting device 120, and then the requesting device 120 can use the key information to connect the target system 130.

In some embodiments, the HRoT device 110 and the host devices 120, 130 may establish a Remote-Procedure Call (RPC) connection between the devices. The RPC connection may be executed over the second connection 114 by utilizing an additional network driver wrapper on top of the second connection. Accordingly, RPC over the second connection may behave like a conventional network RPC stack. This feature may allow the HRoT device 110 to be leveraged to execute Critical Program Information (CPI) or Remote CPI (RCPI) applications and/or process the corresponding data without additional components installed in the HRoT device 110.

Figure 2A:
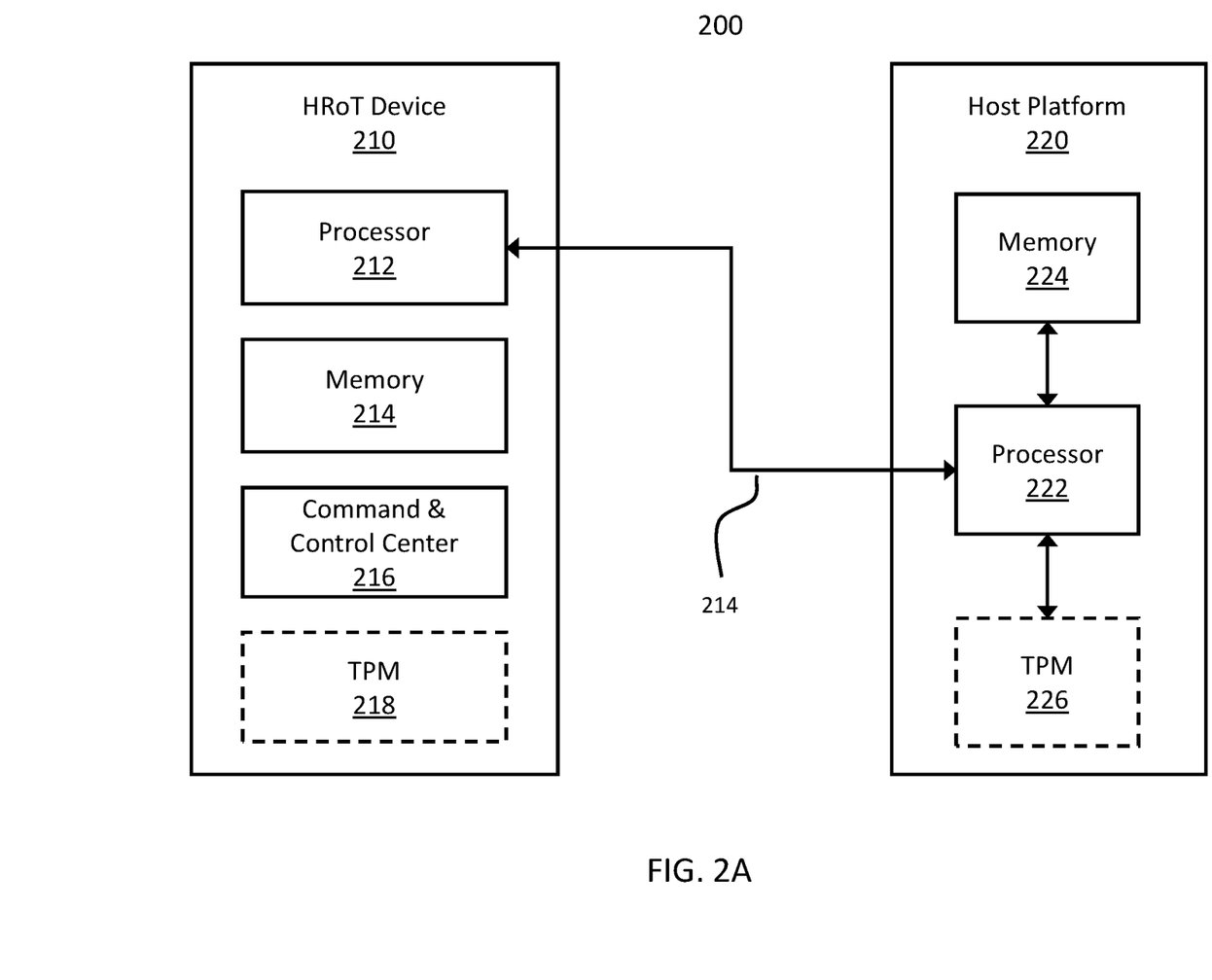
FIG. 2A is a block diagram showing n illustrative security system adopting a Command and Control Center according to the concepts described herein.

Referring now to FIG. 2A, the architecture of an example security system 200 adopting a Command and Control Center is presented. A Command and Control Center (also referred to as a "situation room") may comprise a unit that centralizes monitoring, control, and command of a system's overall operations. In a security control perspective, a Command and Control Center (CCC) connects to at least one critical device in a network where the CCC is responsible for security and performs security control functions for the critical device. The CCC may gather information, analyze security risks, distribute critical instructions, and send out alerts for security issues. Utilizing a CCC, particularly a service-oriented CCC, is known to represent a major shift in security design. The CCC may provide a mechanism for offloading security responsibilities, which is computationally demanding, from a user system (e.g., 220) onto an isolated element (e.g., 216) while improving the overall security of the system.

In some embodiments, the security system 200 may comprise a first device 220 that is connected with an HRoT device 210 through a connection 214. In some embodiments, the connection 214 may comprise a secure connection that provides access to classified information. The first device 220 may include a processor 222 and memory 224. The first device 220 may comprise an optional TPM device 226. The HRoT device 210 may include a processor 212, memory 214, and an optional TPM 218. The HRoT device 210 and the first device 220 may be respective independent systems with similar setups. In an embodiment, the classified connection 214 may be a PCIe bus. Accordingly, the HRoT device 210 may directly access the memory 224 of the first device 220 through DMA transactions.

In embodiments, the HRoT device 210 may load and execute a Command and Control Center (CCC) 216. The CCC may centralize the monitoring, control, and command of overall operations in the system 200. Particularly, the CCC 216 may monitor the security of the first device 220 through the classified connection 214. The CCC 216 utilizes a security policy stored in the CCC when monitoring the first device 220. The CCC 216 may take a stable snapshot of the first device 220 when the first device 220 is validated to have no security risk. When a security attack to the first device 220 is detected, the CCC 216 may capture a current snapshot of the first device 220 and analyze the security attack based upon the captured current snapshot. Furthermore, the CCC 216 may overwrite the first device 220 with the latest stable snapshot.

Figure 2B:
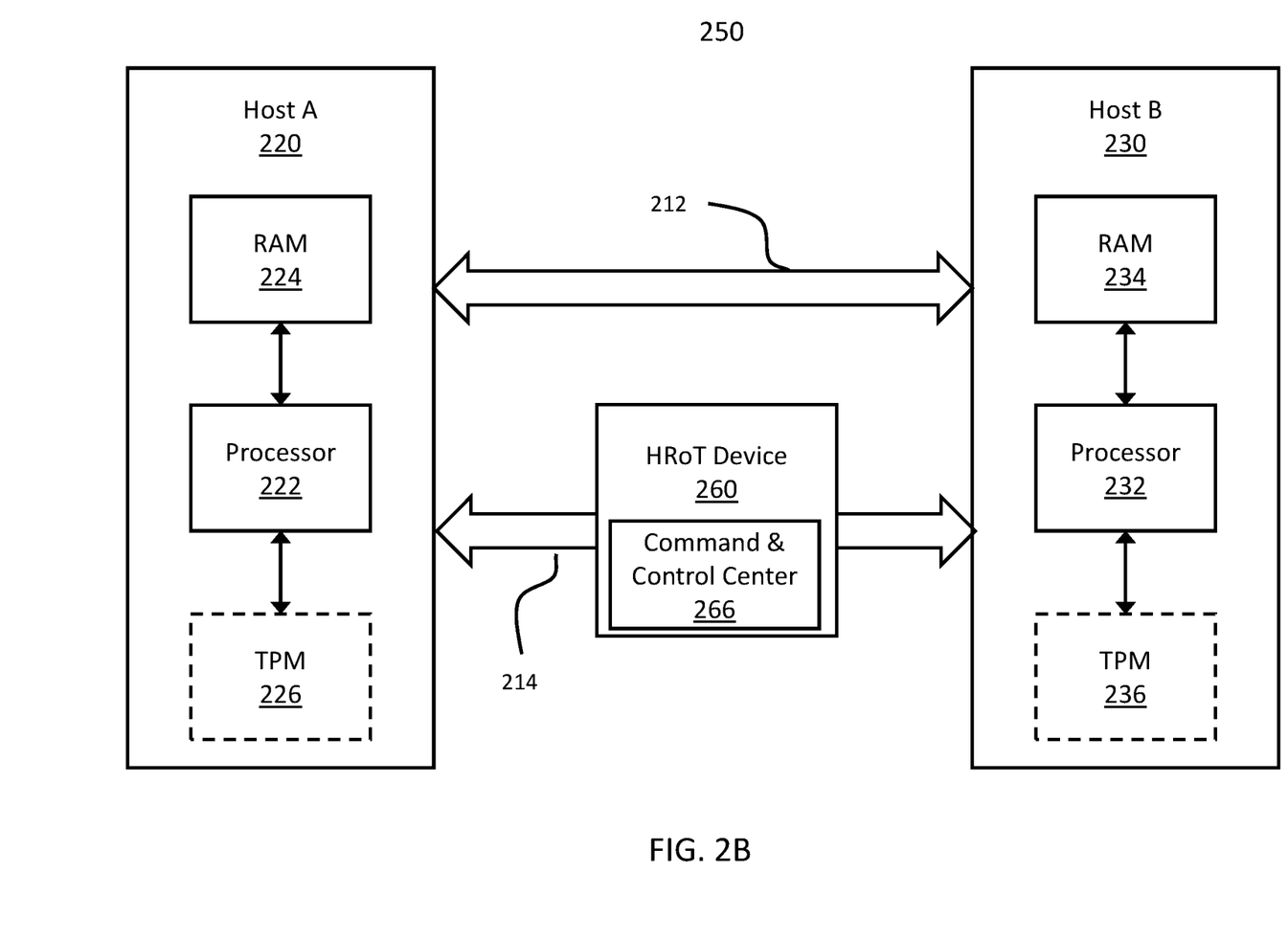
FIG. 2B is a block diagram showing an illustrative security system having a secure connection and a Command and Control Center according to the concepts described herein.

Referring now to FIG. 2B, an HRoT device 260 comprising a CCC 266 may have a similar architecture as the security system in FIG. 1. The security system 250 may include a first host device 220 and a second host device 230. The first device 220 and the second device 230 are connected with a first connection 212 and a second connection 214. In some embodiments, the first connection 212 may provide access to unclassified information and the second connection 214 may provide access to classified information. In other embodiments, the first connection 212 may comprise an unsecured connection and the second connection 214 may comprise a secure connection. The first and second devices 120, 130 may include respective processors 222, 232 and memories 224, 234. In some embodiments, the host devices 220, 230 may include optional TPM devices 226, 236. An HRoT device 260 is coupled to the classified connection 214. The structure of the HRoT device 260 may be substantially similar to the HRoT device 210 of FIG. 2A. The HRoT device 260 and the other devices 220, 230 may be respective independent systems with similar setups. The HRoT device 260 may load and execute a Command and Control Center (CCC) 266. The CCC 266 monitors the security of the first and second devices 220, 230 through the classified connection 214. The CCC 266 may utilize a security policy stored in the CCC when monitoring the first and second devices 220, 230. The CCC 266 may take a stable snapshot of the first and second devices 220, 230 when the first and second devices 220, 230 are validated to have no security risk. When a security attack to the first and/or second devices 220, 230 is detected, the CCC 266 may capture respective current snapshots of the first and second devices 220, 230 and analyze the security attack based upon the captured current snapshots. Furthermore, the CCC 266 may overwrite the first and/or second devices 220, 230 with the respective stable snapshot.

Figure 3:
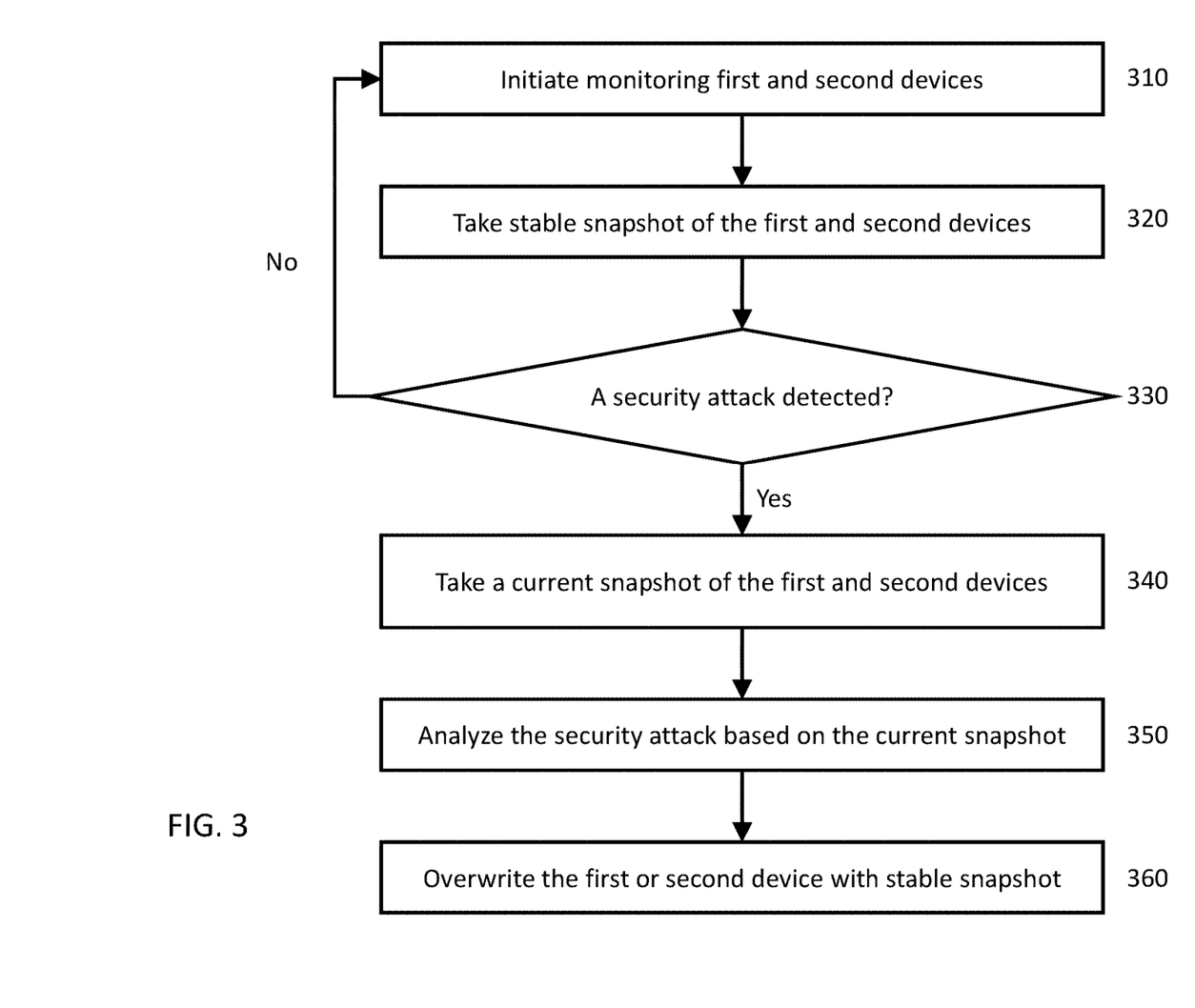
FIG. 3 is a flowchart of a security monitoring process according to the concepts described herein.

FIG. 3 is a flow diagram illustrating the processing performed by a security system (e.g., an HRoT device 110 shown and described above in conjunction with FIG. 1). Rectangular elements (typified by element 310 in FIG. 3), herein denoted "processing blocks," represent computer software instructions or groups of instructions and diamond shaped elements (typified by element 330 in FIG. 3), herein denoted decision blocks represent computer software instructions or groups of instructions which affect the flow of the processing blocks. The processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring now to FIG. 3, a method for security monitoring may be carried out by a security device (e.g., the HRoT device 110 in FIG. 1 or HRoT/CCC 210/216 in FIG. 2A). In processing step 310, the security device initiates monitoring of the first and second devices (e.g., 120, 130 in FIG. 1). Herein, the security device 110 may utilize a security policy stored in the security device 110 when monitoring the first and second devices 120, 130. In processing step 320, the security device 110 may take a stable snapshot of the first and second devices 120, 130 when the first and second devices 120, 130 are validated to have no security risk. In decision block 330, the security device 110 determines whether there is a security attack to at least one of the first and second devices 120, 130. If there is no security attack, the security device goes back to processing step 310 and may continue monitoring of the first and second devices 120, 130. When a security attack to the first and/or second devices 120, 130 is detected, in processing step 340, the security device 110 may capture a current snapshot of the first and second devices 120, 130. In processing step 350, the captured current snapshot is analyzed to find the cause of the security attack. In some embodiments, the captured current snapshot may be sent to another system (e.g., trusted element 150 in FIG. 1) for analysis of a root cause. In processing step 360, the security device 110 may overwrite the first and/or second devices 120, 130 with the respective stable snapshot.

Figure 4:
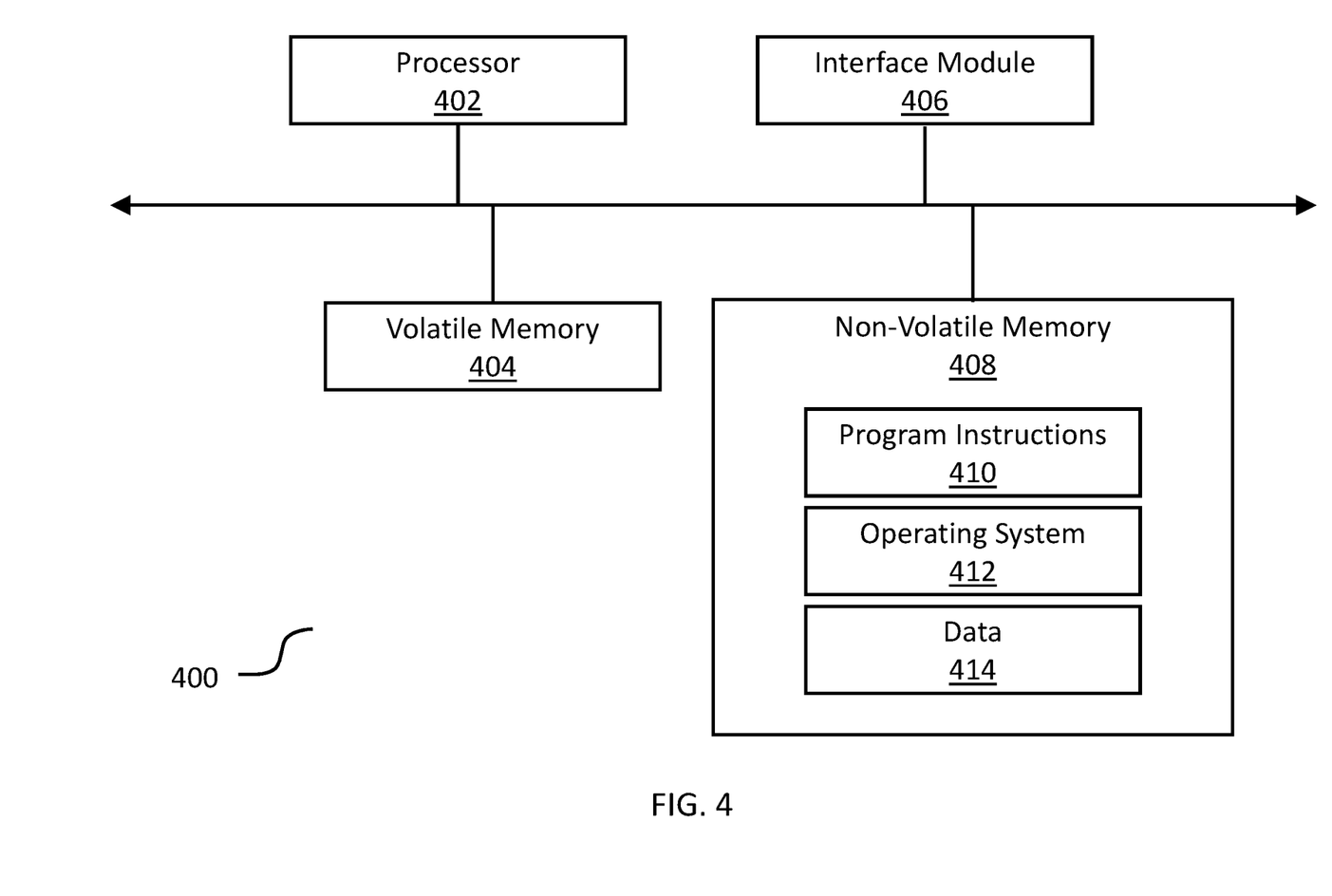
FIG. 4 is an illustrative implementation of a security system described in FIG. 1 according to the concepts described herein.

Referring now to FIG. 4, an illustrative implementation of a processing device 400 which may be suitable to implement the processing techniques described herein includes a processor 402, a volatile memory 404, a non-volatile memory 408 (e.g., hard disk) and the interface module 408 (e.g., a user interface, USB interface and so forth). The non-volatile memory 408 stores computer instructions 410, an operating system 412 and data 414. In one example, the computer instructions 410 are executed by the processor 402 out of volatile memory 404 to perform all or part of the processes described herein (e.g., process 300).

The processes described herein (e.g., process 300) is not limited to use with hardware and software of FIG. 1, FIGS. 2A/2B and/or FIG. 4; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/ machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The inventive concepts described herein may provide a method of supporting cross-domain architectures where the domains have different security measures without introducing security threat that normally comes from unsecure network connection. The presented architecture may provide customizable security policies with attack detection and reporting. Further, the architecture may provide a means of rescuing or repairing systems that are corrupted from security attacks, while implementing the required cross-domain isolation. Lastly, the architecture may provide a mechanism for collaborative and distributed counter-attacks against detected attackers.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

What is claimed is:

1. A system, comprising:
a Hardware Root of Trust (HRoT) device comprising a processor and memory, the HRoT device being configured for connection and authentication to first and second host devices which are configured to communicate via a first communication channel having a first security level and a second communication channel having a second security level which is more secure than the first security level,
wherein the HRoT device is configured to:
connect the first and second host devices via the second communication channel;
monitor security of the first and second host devices over the second communication channel;
detect a security attack to at least one of the first and second host devices; and
in response to the security attack, capture a current snapshot of at least one of the first and second host devices, and analyze the security attack based upon the captured current snapshot.

2. The system of claim 1, wherein the HRoT device is further configured to:
transmit the captured current snapshot to a trusted element for analysis of the security attack.

3. The system of claim 2, wherein the trusted element is configured to:
determine a cause of the security attack;
determine a counter-attack measure to address the security attack; and
distribute the counter-attack measure to at least one of the first and second host devices.

4. The system of claim 1, wherein the HRoT device is configured to:
receive a security policy from a trusted element; and
monitor security of the first and second host devices based upon the security policy,
wherein the security policy comprises a plurality of procedures and rules to follow when a security risk is detected at the first and second host devices.

5. The system of claim 1, wherein the HRoT device is further configured to:

store respective stable snapshots of the first and second host devices when the first and second host devices are validated; and
in response to that a security attack to at least one of the first and second host devices is detected, overwrite at least one of the first and second host devices with a respective stable snapshot.

6. The system of claim 1, wherein the HRoT device is further configured to:
receive a request for a secure key information from at least one of the first and second host devices;
in response to that the secure key information is not stored in the HRoT device, request the secure key information to a key management server; and
provide the secure key information to the respective first or second host device.

7. The system of claim 1, wherein the HRoT device is further configured to:
authenticate the first and second host devices before communicating with the first and second host devices.

8. The system of claim 1, wherein the HRoT device is further configured to:
establish a binding to a respective Trusted Platform Module (TPM) of the first and second host devices; and
authenticate the first and second host devices by exchanging secure keys with the respective TPM of the first and second host devices.

9. The system of claim 1, wherein the second communication channel comprises a Peripheral Component Interconnect Express (PCIe) bus.

10. The system of claim 1, wherein at least one of the first and second communication channels is wireless.

11. A method running on a security device, the method comprising:
monitoring security of a first host device and a second host device, wherein the first and second host devices are configured to communicate via a first communication channel having a first security level and a second communication channel having a second security level which is more secure than the first security level and wherein the security device monitors the first and second host devices via the second communication channel;
taking respective stable snapshots of the first and second host devices when the first and second host devices are validated;
detecting a security attack to the first and second host devices; and
in response to the security attack to at least one of the first and second host devices:
capturing a current snapshot of the at least one of the first and second host devices where the security attack is detected;
analyzing the security attack based upon the captured current snapshot; and
overwriting the at least one of the first and second host devices with the respective stable snapshot.

12. The method of claim 11, further comprising:
receiving a request for a secure key information from at least one of the first nd second host devices;
in response to that the secure key information is not stored in the security device, requesting the secure key information to a key management server; and
providing the secure key information to the respective first or second host device.

13. The method of claim 11, further comprising:
determining a cause of the security attack based upon the captured current snapshot;
determining a counter-attack measure to address the security attack; and
distributing the counter-attack measure to at least one of the first and second host devices.

14. The method of claim 11, wherein the security device comprises a Hardware Root of Trust (HRoT) device.

15. A system for security control, the system comprising:
a first host device comprising a first processor and memory; and
a security device coupled to the first host device over a communication channel, wherein the security device comprises a Command and Control Center (CCC) that is configured to:
monitor security of the first host device;
take a stable snapshot of the first host device when the first host device is validated;
detect a security attack to the first host device; and
in response to the security attack, capture a current snapshot of the first host device, analyze the security attack based upon the captured current snapshot, and overwrite the first host device with the stable snapshot.

16. The system of claim 15, the CCC is further configured to:
determine a cause of the security attack based upon the captured current snapshot;
determine a counter-attack measure to address the security attack; and
distribute the counter-attack measure to the first host device.

17. The system of claim 15, further comprising:
a second host device comprising a second processor and memory, wherein the first and second host devices are configured to communicate via a first communication channel having a first security level and a second communication channel having a second security level which is more secure than the first security level,
wherein the CCC is configured to:
monitor security of the first and second host devices via the second communication channel;
take respective stable snapshots of the first and second host devices;
detect a security attack to the first and second host devices when the first and second host devices are validated; and
in response to the security attack to at least one of the first and second host devices: capture a current snapshot of the at least one of the first and second host devices where the security attack is detected, analyze the security attack based upon the captured current snapshot, and overwrite the first or second host device with the respective stable snapshot.

18. The system of claim 15, wherein the security device comprises a Hardware Root of Trust (HRoT) device.

* * * * *